United States Patent [19]

Castriotta et al.

[11] 4,208,552

[45] Jun. 17, 1980

[54] MALFUNCTION-DETECTING EQUIPMENT FOR REAL-TIME SUPERVISION OF CENTRAL-OFFICE CIRCUITS IN TELECOMMUNICATION SYSTEM

[75] Inventors: Michele Castriotta; Alfredo de Bosio; Spiridione De Micheli; Günter Lobisch; Franco Manucci, all of Turin; Pio Semprini, Rome, all of Italy

[73] Assignee: CSELT - Centro Studi e Laboratori Telecomunicazioni S.p.A., Turin, Italy

[21] Appl. No.: 953,161

[22] Filed: Oct. 20, 1978

[30] Foreign Application Priority Data

Oct. 21, 1977 [IT]  Italy ............................ 69355 A/77

[51] Int. Cl.² .................. H04J 3/14; H04M 3/30; G06F 11/04
[52] U.S. Cl. ............... 179/175.2 D; 179/18 ES; 370/13; 371/21
[58] Field of Search ....... 179/18 ES, 15 BF, 175.2 C, 179/175.2 D; 178/69 G

[56] References Cited

U.S. PATENT DOCUMENTS

| | | | |
|---|---|---|---|
| 3,829,627 | 8/1974 | Short et al. | 179/175.2 D |
| 3,996,423 | 12/1976 | Colton et al. | 179/15 BF |
| 4,031,375 | 6/1977 | Jaskulke et al. | 179/18 ES |

Primary Examiner—Thomas A. Robinson
Attorney, Agent, or Firm—Karl F. Ross

[57] ABSTRACT

Sensors SE and actuators AT electrically linked to groups of circuit components to be monitored, e.g. in a central office of a telephone system, are connected to a preprocessor, interfacing them with a microprocessor, which detects an incoming request signal from any group and, after evaluation, sends it on to the microprocessor, causing the latter to emit a confirmation signal which the preprocessor transmits to the corrsponding group actuator. A component-identification signal received from that group and evaluated by the preprocessor is then forwarded to the microprocessor which thereupon, through the preprocessor, instructs the corresponding component actuator to send out an enabling signal to the component thus identified. A response by that component, in the form of an error signal, also undergoes evaluation in the preprocessor and is then passed on to the microprocessor where it is classified and read out to a printer.

6 Claims, 3 Drawing Figures

MALFUNCTION-DETECTING EQUIPMENT FOR REAL-TIME SUPERVISION OF CENTRAL-OFFICE CIRCUITS IN TELECOMMUNICATION SYSTEM

FIELD OF THE INVENTION

Our present invention relates to equipment for the detection of malfunctions in central-office circuitry of telephone or other telecommunication systems in which a multiplicity of circuit components are to be continuously monitored for possible operational defects.

BACKGROUND OF THE INVENTION

Major exchanges of the indirect-control type, using crossbar or cross-point switching, are generally provided with malfunction detectors which can be summoned by circuit components such as registers, markers or senders, for example, to check on their operation whenever any of these components fails to complete a prescribed sequence of steps or otherwise departs from its normal performance. The fault giving rise to the intervention of the malfunction detector does not necessarily lie within the summoning component itself but may be due to a defect elsewhere in the associated circuit. Thus, it may be necessary to trace the source of the malfunction by correlating error signals from several coacting circuit elements and also taking into account the nature of these error signals which may be suitably coded or timed to indicate various types of defects, such as an unsuccessful parity check or a deviation from a normal voltage level. Heretofore, this tracing of defective circuit components has been largely performed by human operators examining the error codes emitted by a malfunction detector, usually in the form of a printout. Such mental correlation of failure signals is time-consuming and not always reliable since it depends on the skill of the operator. Prior attempts at automating the defect-tracing procedure have not been commercially successful, mostly on account of the complexity and high cost of the processing equipment used for this purpose.

OBJECT OF THE INVENTION

The object of our present invention, therefore, is to provide improved means for automatically detecting malfunctions of a large number of electrical circuit components in real time, enabling a rapid tracing of the source of the trouble so as to expedite a return to normal operation.

SUMMARY OF THE INVENTION

We realize this object, in accordance with our present invention, by providing a multiplicity of sensors, connected to the various circuit components to be monitored for receiving incoming signals therefrom, and a multiplicity of actuators (sometimes termed drivers) also connected to these components for transmitting outgoing signals thereto. An incoming-signal memory (referred to hereafter as the first memory) has cells respectively allocated to the several monitored components for storing information relating to this operating condition while an outgoing-signal memory (referred to hereafter as the second memory) has cells respectively allocated to these components for storing activating commands destined for them.

We also provide processing means connectable to these memories for addressing selected cells of the second memory to send activating commands to associated components by way of the corresponding activators and reading the contents of corresponding cells of the first memory to detect malfunction indications from responses to these commands received by way of the corresponding sensors. The identity of a component giving rise to such a failure indication is registered by indicator means known per se, such as a printer or a card perforator, controlled by the processing means.

The processing means may be subdivided into a preprocessor and a microprocessor of the type described in commonly owned U.S. Pat. application Ser. No. 886,526 filed Mar. 14, 1978 by two of us, Michele Castriotta and Spiridione de Micheli. The disclosure of this prior application is hereby incorporated by reference into the present one.

BRIEF DESCRIPTION OF THE DRAWING

The above and other features of our invention will now be described in detail with reference to the accompanying drawing in which.

SPECIFIC DESCRIPTION

Figure 1:
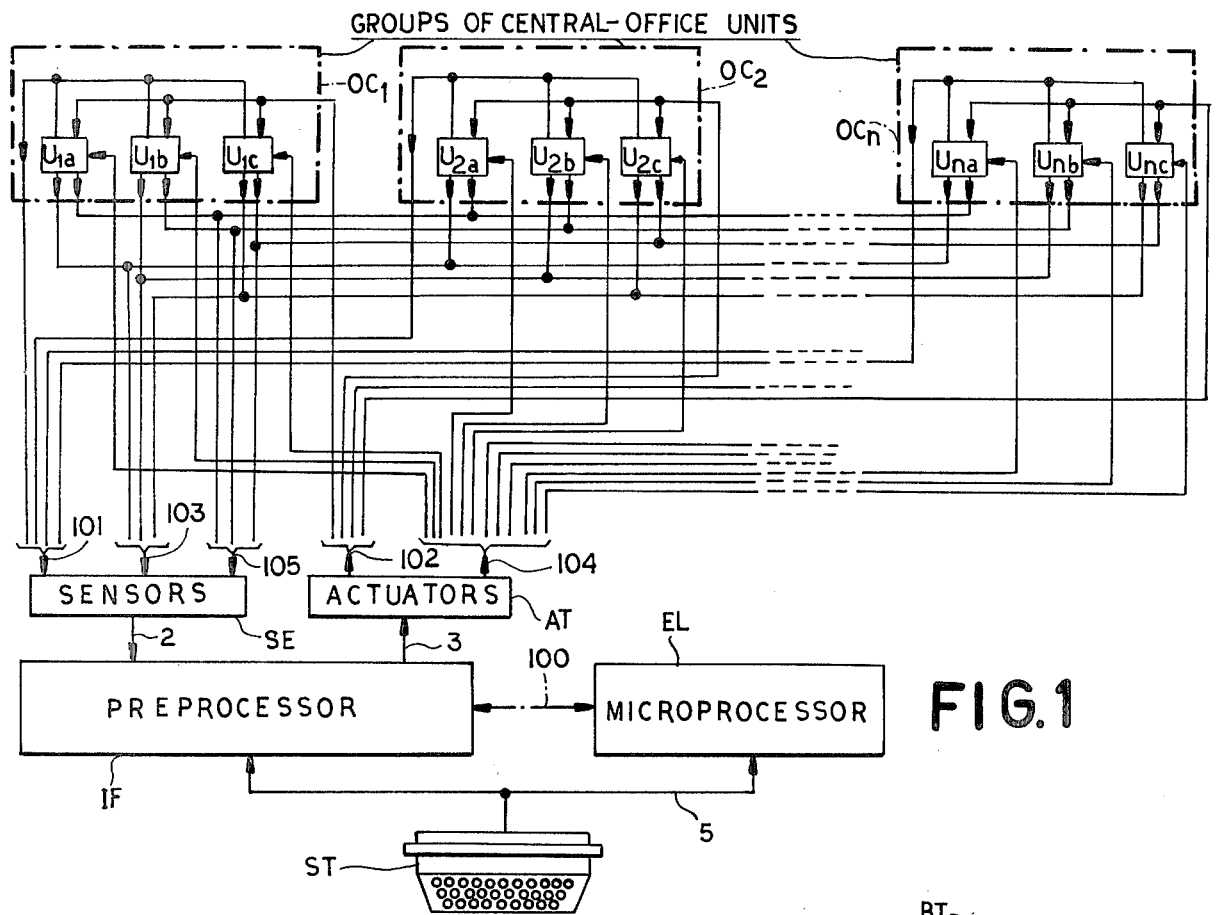
FIG. 1 is a block diagram showing several groups of circuit components supervised by malfunction-detecting equipment according to our invention.

In FIG. 1 we have illustrated several groups of central office components (referred to hereinafter as units) to be monitored, i.e. a group $OC_1$ including units $U_{1a}$, $U_{1b}$, $U_{1c}$, a group $OC_2$ including units $U_{2a}$, $U_{2b}$, $U_{2c}$, and a group $OC_n$ including units $U_{na}$, $U_{nb}$, $U_{nc}$. A multiplicity of sensors SE and actuators or drivers AT communicate with these units via incoming conductor multiples 101, 103, 105 and outgoing conductor multiples 102, 104, respectively. Sensors SE and actuators AT are connected by way of respective multiples 2 and 3 to a preprocessor IF interfacing these sensors and actuators with a microprocessor EL substantially in the manner described in commonly owned application Ser. No. 886,526 referred to above. Preprocessor IF and microprocessor EL communicate with each other via a bus 5 and also by way of internal connections 100 more fully described hereinafter. Bus 5 is further connected to a printer ST having a keyboard which may be used by an operator, as known per se, to maintain the seizure of a monitored unit whose operation is being investigated.

The incoming leads of multiple 101 are connected in parallel to all units of respective groups $OC_1$–$OC_n$, as are the outgoing leads of multiple 102. Incoming multiple 103 has individual leads each connected in parallel to homologous units of all the groups, such as $U_{1a}$–$U_{1n}$, the same being true of incoming multiple 105. Outgoing multiple 104 has leads individually connected to all the units to be monitored.

Conductors 101 convey to respective sensors SE a request signal for the intervention of malfunction detector IF, EL in the event of improper operation of any unit of a particular group. In response to such a request signal, a confirmation signal constituting a preliminary activating command goes out on the corresponding lead of multiple 102 to that group. This confirmation signal results in the emission, by the originating unit, of an identification signal on the corresponding lead of multiple 103 whereupon the malfunction detector sends back an enabling signal as a follow-up activating command to the unit in question through the associated conductor of multiple 104. The unit thus enabled transmits an error signal on the corresponding lead of multiple 105.

Figure 2:
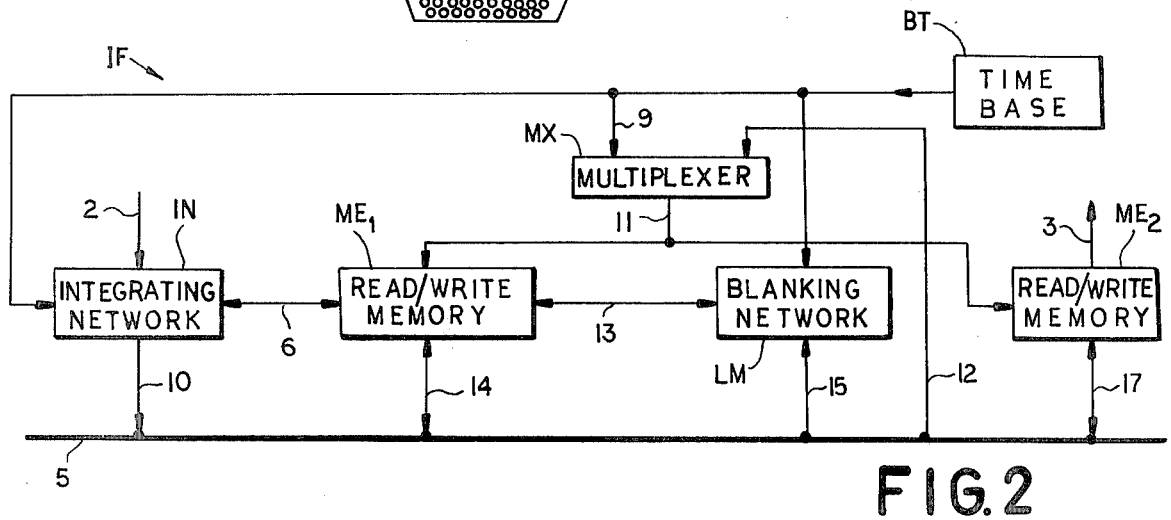
FIG. 2 is a more detailed block diagram of a preprocessor forming part of the equipment of FIG. 1.

FIG. 2 shows details of the preprocessor IF, similar to the one shown in application Ser. No. 886,526, whose constituents have been designated by the same references. These constituents comprise a first read-write memory $ME_1$ for the storage of incoming signals, an integrating network IN communicating with memory $ME_1$ via a two-way link 6, a blanking or masking network LM communicating with memory $ME_1$ via a link 13, and a second read-write memory $ME_2$ for the temporary storage of outgoing signals. A multiplexer MX is controlled by clock pulses CK from a time base BT to establish a succession of time slots in a recurring data frame for the scanning of all the incoming leads terminating at sensors SE and all the outgoing leads originating at actuators AT (FIG. 1), each time slot being divided into a synchronous phase and an asynchronous phase in which an output multiple 11 of multiplexer MX is respectively connected to an address multiple 9 and a similar multiple 12. Multiple 9 extends from an output of time base BT on which the address codes of the several cells of memories $ME_1$ and $ME_2$ are cyclically read out during respective time slots. Multiple 12 branches off an address channel of bus 5 and allows selected cells of memories $ME_1$, $ME_2$ to be linked with a data channel of bus 5 via multiples 14 and 17 for reading or writing during the asynchronous phase of any time slot. It should be noted that memories $ME_1$ and $ME_2$, although illustrated as part of preprocessor IF, may in fact be sections of a larger memory included in microprocessor EL of FIG. 1, the connections 6, 11 and 13 between these memories and the actual constituents of the preprocessor being part of the link 100 of FIG. 1 and being thus independent of bus 5.

Address lead 9 also extends to integrating network IN and blanking network LM which communicate with the data channel of bus 5 by way of respective connections 10 and 15; these connections advantageously include respective input and output gates as described and shown in application Ser. No. 886,526. Incoming multiple 2 terminates at network IN whereas outgoing multiple 3 originates at memory $ME_2$.

Figure 3:
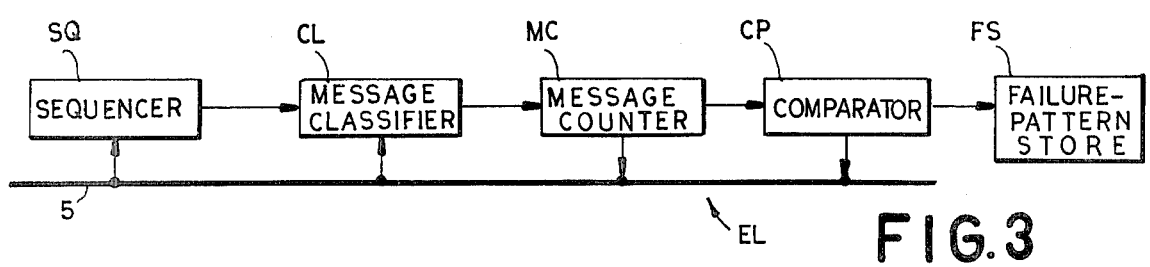
FIG. 3 is a similar block diagram of a microprocessor also included in that equipment.

As shown in FIG. 3, microprocessor EL comprises (in addition to other components such as the aforementioned larger memory) a sequencer SQ controlling the above-described exchange of signals via multiples 101–105, a message classifier CL designed to separate detected malfunction codes according to their character into corresponding categories, a message counter MC serving to register the number of recurrences of malfunction codes of each category, a failure-pattern store FS containing a table of possible malfunctions, and a comparator CP serving to match the output of counter MC (indicative of a predetermined number of recurrences of a given type of malfunction code) with one of the entries in store FS. If such a match is detected, the identity of the affected unit or units and the nature of the failure are transmitted to printer ST; if the comparison is unsuccessful, the malfunction codes and unit addresses registered in counter MC are transmitted as a whole to the printer whereupon the classifier CL is cleared.

Memories $ME_1$ and $ME_2$ have, of course, sufficient cells to serve all the associated sensors and actuators, respectively. Thus, one part of each memory is occupied by cells associated with group leads 101, 102 whereas another part has cells associated with unit leads 103, 104, 105. The illustrated multiplying of leads 103 and 105 to homologous units of different groups simplifies the connections but is not essential; in fact, it may be advantageous to link the several units individually with respective sensors by way of separate leads 103, 105, in a manner analogous to that shown for leads 104 originating from actuators individual to each unit.

The assembly of sensors SE and the assembly of actuators AT may each comprise one or more magnetic-core matrices with rectangular hysteresis loops of the type described in commonly owned U.S. Pat. application Ser. No. 769,270 filed Feb. 11, 1977 by one of us, Spiridione de Micheli. We also wish to incorporate the disclosure of that application, by reference, in the present one to the extent of its applicability to the circuit arrangement of FIG. 1.

Integrating network IN may comprise a read-only memory (ROM), as described in application Ser. No. 886,526, which is inserted in a feedback loop of memory $ME_1$ and stores various integration codes to be read out from cells of that ROM jointly addressed by an activity bit appearing in a given time slot on a corresponding lead of multiple 2 and by the contents of the corresponding cell of memory $ME_1$ relating to the past activity of the respective unit as detected in the preceding frame or scanning cycle. The ROM supplies to that cell of memory $ME_1$, in updating its contents, not only a status bit but also a numerical code representing the number of recurrences of the same activity bit since the last detected status change, such a status change being considered definitely established when that number reaches a predetermined value. At that point the network energizes its output lead 10 to inform the microprocessor EL, via the data channel of bus 5, of the detected status change; this information is accompanied by the corresponding unit address then appearing on multiple 9.

Blanking network LM may include another read-only memory, as likewise described in application Ser. No. 886,562, also inserted in a feedback loop of memory $ME_1$. This ROM stores masking bits which, in certain time slots, are fed to the respective cells of memory $ME_1$ to inhibit the transmission of a change-of-state signal via connection 10 to bus 5; the ROM intervenes only upon an instruction from microprocessor EL, received via bus 5 and connection 15, to change the blanking information stored in a selected cell of memory $ME_1$, i.e. to insert a masking bit into that cell or to delete such a bit previously inscribed therein.

Blanking network LM is thus able to prevent the reporting of any status change, detected by one of the sensors SE, to microprocessor EL. In the system here contemplated, such inhibition is normally applied to signals incoming over leads 103 and 105 whereas request signals from leads 101 are not blanked. Upon the evaluation of a request signal by network IN and the establishment of its nontransient character, sequencer SQ (FIG. 3) registers its arrival in the time slot allocated to the particular group (e.g. $OC_1$) from which it originated. The sequencer then causes the loading of a corresponding cell of memory $ME_2$, during one of the asynchronous phases of a frame, with a confirmation signal which in the synchronous phase of the corresponding time slot is sent to the respective group actuator in assembly AT for energization of the associated lead of multiple 102. The arrival of this confirmation signal at the group activates the improperly operating unit or units of that group to emit their respective identification signals over leads of multiple 103. Since the microprocessor has meanwhile instructed the blanking network LM to cancel the masking bits in that part of memory $ME_1$ whose cells are associated with multiple 103, the unit-identification signal or signals are forwarded—after evaluation in integrating network IN—to the sequencer SQ. If identification signals arrive from several units simultaneously, sequencer SQ selects one of these units according to a predetermined order of priority and causes the emission of an enabling signal to the cell of memory $ME_2$ assigned to that unit for energization of the corresponding lead of multiple 104 during the next time slot in which that lead is being scanned. The selected unit (e.g. unit $U_{1a}$) then emits an error signal on the corresponding lead of multiple 105, again after network LM has been instructed to unblank that part of memory $ME_1$ whose cells are assigned to this multiple. After proper evaluation of network IN, the arriving error signal is transmitted via connection 10 and bus 5 to microprocessor EL for reception by message classifier CL which has been primed by sequencer SQ.

When the same sequence of operations has been repeated a number of times, message counter MC feeds a corresponding malfunction code to comparator CP which operates in the aforedescribed manner to determine whether that code corresponds to any entry in the table of failure patterns contained in store FS. After the result has been delivered to printer ST for recording, microprocessor stages SQ, CL and LC are restored to normal.

It will be apparent that the leads of multiples 101-105 may be arranged in different ways to identify intervention-requesting groups and units and to enable a selected unit to emit the actual error signal. If memory $ME_2$ has cells served by leads 103 and 105 emanating from individual units, microprocessor EL will cause network LM to unblank only those cells of this memory section that pertain to a group from which an intervention request has been received and acknowledged.

Although our invention has utility in monitoring the operation of fully automated central-office equipment, groups $OC_1$-$OC_n$ of FIG. 1 could also represent a set of manually operated switchboards for the establishment of connections between operators' positions and trunk lines with the aid of semicords plugged into jacks connected to these trunk lines, e.g. as disclosed in commonly owned Italian patent application No. 69356-A/77, filed Oct. 21, 1977, and corresponding U.S. application Ser. No. 953,163 filed Oct. 20, 1978 by Luciano Astegiano et al. In the system referred to, a request signal is sent out by a current sensor (which may be one of the cores of a matrix as described in application Ser. No. 769,270) whenever a semicord is plugged into a jack whereupon a processor sends back a confirmation signal resulting in the operation of a relay in a cord-side identification circuit. Other, similar current sensors then report the proper operation of that relay and the establishment of a loop to a trunk-side identification circuit, after which the processor commands a switchover by the operation of a further relay with resulting release of the first-mentioned relay. Any continued energization of the current sensor associated with the latter relay is interpreted as an error signal by the processor.

Thus, microprocessor EL of FIGS. 1 and 3 may possibly be regarded as part of a higher-order processor controlling other operations, such as the establishment and termination of connections, in addition to the tracing of any malfunctions.

The keyboard of printer ST may be used by an operator to send, via memory $ME_2$ and a respective lead 104, a seizure signal to a selected unit eliciting the emission of a status signal, indicative of its operating condition, on the corresponding lead 105 even if no intervention request has been previously received from the group; that seizure signal, constituting an activating command, is accompanied by an instruction to network LM, via connection 15, for the unblanking of the cell of memory $ME_1$ assigned to this particular lead 105.

We claim:
1. In a telecommunication system provided with a multiplicity of circuit components to be monitored for possible malfunctions,
in combination:
a multiplicity of sensors connected to said components for receiving incoming signals therefrom;
a multiplicity of actuators connected to said components for transmitting outgoing signals thereto;
an incoming-signal memory with cells respectively allocated to said components for storing information relating to their operating condition;
an outgoing-signal memory with cells respectively allocated to said components for storing activating commands destined therefor;
processing means provided with connections to said memories for addressing selected cells of said outgoing-signal memory to send activating commands to associated components via the corresponding actuators and reading the contents of corresponding cells of said incoming-signal memory to detect malfunction indications from responses to said commands received via corresponding sensors;
indicator means controlled by said processing means for registering the identity of a component giving rise to a failure indication; and
scanning means connected to said memories for cyclically connecting the cells thereof to associated sensors and actuators in certain phases of respective time slots of a recurrent frame, said connections being available in other phases of said time slots for communication of said memories with said processing means.

2. In a telecommunication system provided with a multiplicity of circuit components to be monitored for possible malfunctions, said components being divided into groups,
in combination:
a multiplicity of sensors connected to said components for receiving incoming signals therefrom, the components of each group being provided with common signaling means for sending a request signal to one of said sensors upon improper operation of any component of the group;
a multiplicity of actuators connected to said components for transmitting outgoing signals thereto;
an incoming-signal memory with cells respectively allocated to said components for storing information relating to their operating condition, said incoming-signal memory having a first part for the storage of request signals from any group and a second part for the storage of operating information from individual components;

an outgoing-signal memory with cells respectively allocated to said components for storing activating commands destined therefor;

processing means provided with connections to said memories for addressing selected cells of said outgoing-signal memory to send activating commands to associated components via the corresponding actuators and reading the contents of corresponding cells of said incoming-signal memory to detect malfunction indications from responses to said commands received via corresponding sensors, said processing means including circuitry responsive to said request signal for generating an activation command to be sent to a component of the group giving rise to said request signal;

blanking means connected to said incoming-signal memory and controlled by said processing means for preventing the readout of any cell of said second part in the absence of an activation command written in a corresponding cell of said outgoing-signal memory in response to a request signal; and indicator means controlled by said processing means for registering the identity of a component giving rise to a failure indication.

3. In a telecommunication system provided with a multiplicity of circuit components to be monitored for possible malfunctions, said components being divided into groups, in combination:

a multiplicity of sensors connected to said components for receiving incoming signals therefrom, the components of each group being provided with common signaling means for sending a request signal to one of said sensors upon improper operation of any component of the group;

a multiplicity of actuators connected to said components for transmitting outgoing signals thereto;

an incoming-signal memory with cells respectively allocated to said components for storing information relating to their operating condition;

an outgoing-signal memory with cells respectively allocated to said components for storing activating commands destined therefor;

processing means provided with connections to said memories for addressing selected cells of said outgoing-signal memory to send activating commands to associated components via the corresponding actuators and reading the contents of corresponding cells of said incoming-signal memory to detect malfunction indications from responses to said commands received via corresponding sensors;

indicator means controlled by said processing means for registering the identity of a component giving rise to a failure indication; and integrating means inserted between said sensors and said incoming-signal memory for evaluating incoming request signals and operating information before transmitting same to said processing means.

4. In a telecommunication system provided with a multiplicity of circuit components to be monitored for possible malfunctions, in combination:

a multiplicity of sensors connected to said components for receiving incoming signals therefrom;

a multiplicity of actuators connected to said components for transmitting outgoing signals thereto;

an incoming-signal memory with cells respectively allocated to said components for storing information relating to their operating condition;

an outgoing-signal memory with cells respectively allocated to said components for storing activating commands destined therefor;

processing means provided with connections to said memories for addressing selected cells of said outgoing-signal memory to send activating commands to associated components via the corresponding actuators and reading the contents of corresponding cells of said incoming-signal memory to detect malfunction indications from responses to said commands received via corresponding sensors; and indicator means controlled by said processing means for registering the identity of a component giving rise to a failure indication;

said processing means including classification means for separating detected malfunction indications of different character into corresponding categories, a store of failure patterns, and comparison means for finding a match between malfunction indications of a given category and any of said failure patterns.

5. The combination defined in claim 4 wherein said components are divided into groups and the components of each group are provided with common signaling means for sending a request signal to one of said sensors upon improper operation of any component of the group, said processing means including circuitry responsive to said request signal for generating an activation command to be sent to a component of the group giving rise to said request signal.

6. The combination defined in claim 1, 2 or 4, further comprising integrating means inserted between said sensors and said incoming-signal memory for evaluating incoming request signals and operating information before transmitting same to said processing means.

* * * * *